United States Patent [19]

Di Camillo

[11] Patent Number: 4,965,964
[45] Date of Patent: Oct. 30, 1990

[54] PORTABLE APPARATUS FOR PROCESSING MARBLE TILE

[76] Inventor: John Di Camillo, Starr Ridge Rd., Brewster, N.Y. 10509

[21] Appl. No.: 297,647
[22] Filed: Jan. 17, 1989
[51] Int. Cl.$^5$ .............................. B24B 9/06; B24B 7/22
[52] U.S. Cl. ........................................ 51/47; 51/33 R; 51/126; 51/283 R
[58] Field of Search ...................... 125/2, 3, 4, 5, 12, 125/13 R, 13 SS, 14; 51/33 R, 102, 166 FB, 283 E, 283 R, 128, 240 GB, 126, 47, 108, 267; 408/136; 409/220; 269/303, 305, 307, 15

[56] References Cited

U.S. PATENT DOCUMENTS

| | | | |
|---|---|---|---|
| 1,687,252 | 10/1928 | Laessker | 51/267 |
| 2,137,140 | 11/1938 | Lewis | 51/33 R |
| 3,837,757 | 9/1974 | Levine | 408/136 X |
| 4,583,515 | 4/1986 | Ballenger | 51/267 X |

FOREIGN PATENT DOCUMENTS

| | | | |
|---|---|---|---|
| 2255993 | 12/1973 | France | 408/16 |
| 2539669 | 7/1984 | France | 125/12 |
| 0012392 | of 1902 | United Kingdom | 125/4 |

Primary Examiner—J. J. Hartman
Assistant Examiner—Bruce P. Watson
Attorney, Agent, or Firm—Nolte, Nolte & Hunter

[57] ABSTRACT

A portable apparatus for drilling and shaping tile at a worksite has a base assembly with a support arm extending upright therefrom. A horizontal housing, rotatably connected at one end to the support arm, houses a slide assembly which supports a router; the slide assembly including a set of wheels for rolling and guiding the router radially in relation to the support arm. An adjustable annular collar about the support arm fixes the height of the horizontal housing and the associated router with respect to the support arm. Further adjustment of the height of the router in relation to the base assembly is accomplished by using a turnbuckle assembly which lowers the support arm into and withdraws it from the base assembly. A work tray supported on the base assembly has markings to position and guide the tile with respect to cutting tools rotatably fixed to the router for drilling holes in and linearly and arcuately shaping the tile. The cutting tools are cooled and lubricated by a liquid recirculating system.

1 Claim, 5 Drawing Sheets

PORTABLE APPARATUS FOR PROCESSING MARBLE TILE

BACKGROUND OF THE INVENTION

This invention relates generally to a portable apparatus for drilling and shaping tile at a worksite and, more particularly, to a portable routing device which will allow marble tile and other earth stones to have holes drilled in them or to have their edges or faces bull-nosed or similarly shaped in an immediate, accurate and economical manner.

In the installation of marble tile or other earth stones, it is often necessary to have the edges of the tile bull-nosed in order to create a finished appearance. There are also many occasions when it is necessary to drill holes in the tile to accommodate electrical or plumbing services or for some alternative purpose. At still other times, a particular installation may require that certain tile be cut along an arcuate path. It is desired that all of these shaping and cutting operations be performed in a fast, accurate and economical manner.

Apparatus for the drilling and shaping of marble tile are known in the prior art. Inexpensive hand tools are available, but they are slow and neither accurate nor economical to use. Other mechanical devices are known, but these are very large and heavy machines used during tile manufacture. Their size and expense prevent them from being readily available to marble artisans and installers who need to perform these types of processing operations routinely.

Thus, for example, U.S. Pat. No. 123,244 to Daniels and Willett and U.S. Pat. No. 125,990 to Saffer both illustrate large, heavy devices which drill, polish and otherwise process marble tile. In both of these machines, the tile is fixed in place and the cutting head is passed across it in a straight line. Not only are these machines not portable in that they cannot be readily transported from one worksite to the next, but they are also incapable of shaping a tile along an arcuate path.

Routers capable of shaping along an arcuate path are also known in the prior art. Therefore, U.S. Pat. No. 2,428,620 to Huck discloses a radial arm router for use with printing plates. In U.S. Pat. No. 2,482,620, the printing plate is clamped in place on the work table and the router is moved across it in any straight or arcuate path desired. This device is not only limited in accuracy, but again, it is not readily transported from one location to the next.

Although marble tile manufacturers have successfully employed machines similar to the above-described machines shown and disclosed in U.S. Pat. No. 123,244 and U.S. Pat. No. 125,990, the limitations inherent in such machines and the need for more versatile and portable means for accomplishing the desired drilling, bull-nosing and otherwise shaping of marble tile will be readily apparent to those skilled in the art. Further, radial arm routers such as the above-described machine shown and disclosed in U.S. Pat. 2,482,620 have their own limitations and do not fill the need for accuracy and portability desired in these devices.

The present invention seeks to meet this problem of the prior art by providing a drilling and shaping device which is simple in construction, lightweight and portable and accurate in drilling holes in, as well as bull-nosing or otherwise shaping, marble tile or other earth stones.

In the present invention, a router is slidably mounted on a horizontal arm which, in turn, may be rotated about the central axis of a vertical support arm. The horizontal arm may be raised or lowered so that various thicknesses of the tile may be shaped or have holes drilled in them. A four-sided tray has guidelines on its bottom surface so that once the router is locked into position a marble tile may be directed past an associated cutting tool in order to shape its edge. Since the horizontal arm may be rotated about the axis of the vertical support arm and the router may be positioned radially from the vertical support arm, arcs having an infinite variety of radii may be cut in the tile.

SUMMARY OF THE INVENTION

Thus, the present invention covers a portable apparatus for drilling and shaping tile at a worksite having a base, a support arm extending vertically from said base, a horizontal arm pivotally connected to said support arm, rotatable cutting means slidably mounted on said horizontal arm, a chuck or other suitable holder means fixedly connected to and rotatable with said rotatable cutting means, a cutting tool removably mounted in and rotatable with said holder means for supplying the shape to be cut into the tile and tray means for positioning and guiding the tile. Additionally, the portable apparatus for drilling and shaping tile as above described wherein the horizontal arm may be raised or lowered to accommodate various thicknesses of tile for drilling and shaping and wherein a cooling and lubricating liquid is supplied to the cutting tool.

The present invention additionally covers a method of bull-nosing or otherwise shaping the edge or face of a tile which consists of attaching an appropriately shaped cutting tool into the chuck of a router, locking the router in a fixed position with the associated cutting tool facing downward, adjusting the height of the router to properly align the associated cutting tool with respect to the thickness of the tile to be shaped and guiding the tile past the spatially fixed but rotating cutting tool so as to cut the desired shape into the tile's edge or face.

The present invention additionally covers a method of cutting a hole in a tile which consists of attaching a hole-cutting tool of the appropriate diameter into the chuck of a router, locking the router in a fixed position with the associated hole-cutting tool facing downward, adjusting the height of the router so that the tile may be placed flatly between the hole-cutting tool and a horizontal support tray and properly aligned with respect to the hole-cutting tool and lowering the router to permit the associated hole-cutting tool to contact and cut through the tile.

The present invention further covers a method of bull-nosing or otherwise shaping the edge or face of a tile along an arcuate path which consists of attaching an appropriately shaped cutting tool into the chuck of a router, spatially fixing the tile in the proper position with respect to the central axis about which the router will be swung, locking the router at the proper radial distance from the central axis about which it will swing in order to cut an arc of the desired radius, adjusting the height of the router to properly align the associated cutting tool with respect to the thickness of the tile to be shaped and swinging the router in an arc from one side of the tile to the other side so as to cut the desired arc into the tile.

Accordingly, it is an object of the present invention to provide an apparatus for drilling and shaping tile which is portable and can, therefore, be transported from one worksite to another.

It is another object of the present invention to provide a portable apparatus which will accurately drill holes in tile and cut desired shapes into the edges and faces of tile.

It is another object of the present invention to provide a portable apparatus for drilling and shaping tile which has a relatively simple structure and is easy to operate.

It is a further object of the present invention to provide a portable apparatus for drilling and shaping tile having a cutting tool fixedly attached to and rotatable with a rotatable cutting means and positioning means for the rotatable cutting means vertically, radially and angularly with respect to a vertical support arm.

It is yet another object of the present invention to provide a portable, immediate and accurate method of drilling holes in and shaping the edge or face of a tile, both linearly and arcuately, while at a worksite.

These and other objects will become apparent, as will a better understanding of the structure and operation of the present invention, when reference is made to the description which follows taken with the drawings in which:

DETAILED DESCRIPTION OF THE INVENTION

Figure 1:
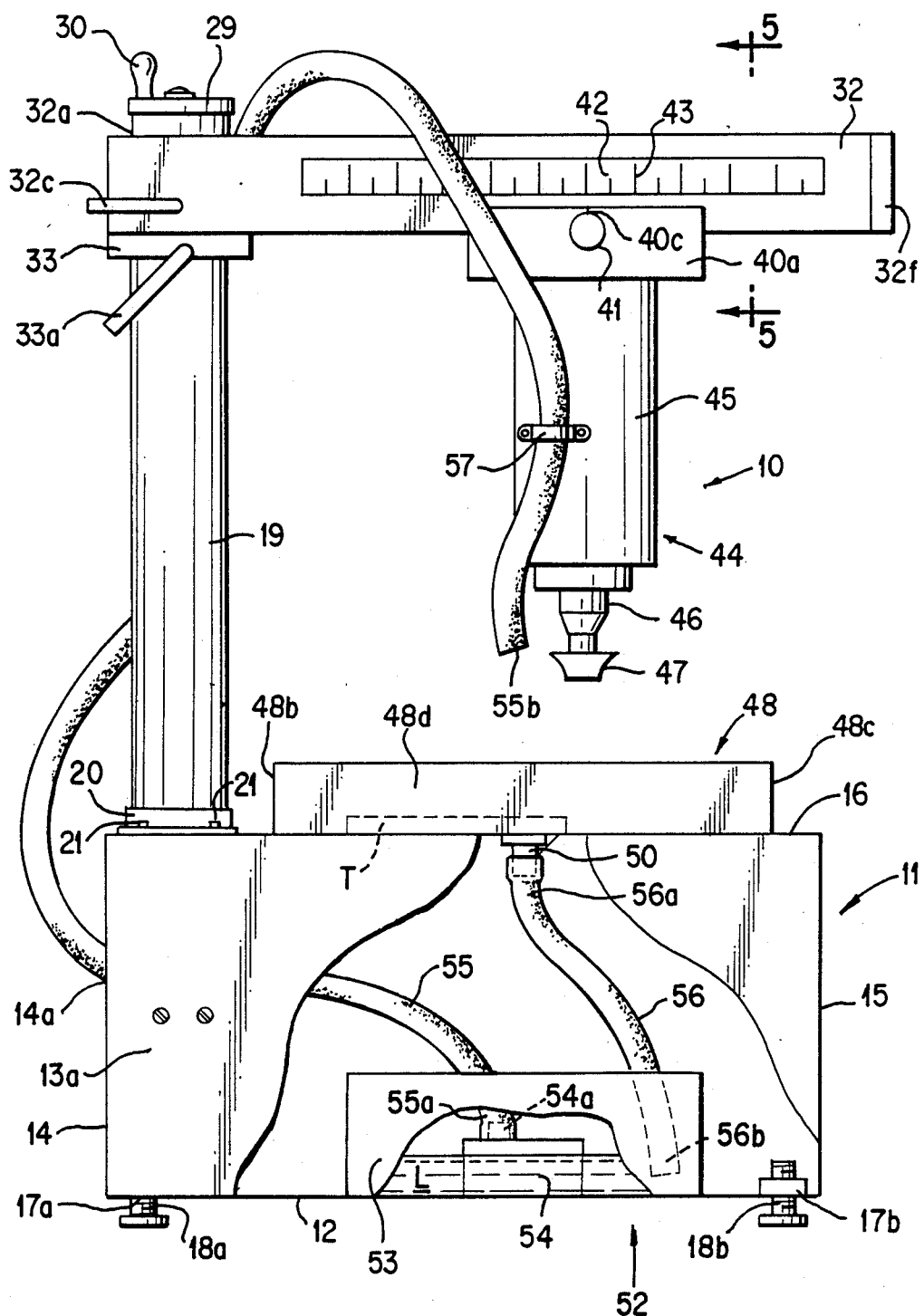
FIG. 1 is a left sided diagrammatic elevational view of the preferred embodiment of a portable apparatus for drilling and shaping tile in accordance with the present invention; with the based broken away in fragmentary cross section to show the liquid reservoir, the associated supply and return tubing and the attachment to the drain in the guidance tray; with the reservoir further broken away in fragmentary cross section to show the operative relation of the pump with respect to the liquid reservoir and the liquid supply tubing.

Referring to the drawings, FIGS. 1 to 5A show the preferred form of the portable apparatus for drilling and shaping tile generally designated 10 in accordance with the present invention.

Portable apparatus 10 for drilling and shaping tile has a generally cubical base assembly 11. Base assembly 11 includes a horizontal flat bottom panel 12, two upright side panels as at 13a and 13b, an upright back panel 14, an upright front panel 15 and a horizontal flat top panel 16. Back panel 14 and front panel 15 are connected generally normal to side panels 13a and 13b by any suitable means. Side panels 13a and 13b, back panel 14 and front panel 15 are connected generally normal to the flat bottom panel 12 and the flat top panel 16 by any suitable means. Threaded bores as at 17a, 17b, 17c and 17d in the four corners of the flat bottom panel 12 can receive threaded members 18a, 18b, 18c and 18d, respectively, to provide means for leveling base assembly 11 on the floor, ground or other horizontal surface, as is shown in FIGS. 1, 2 and 3 of the drawings.

Figure 2:
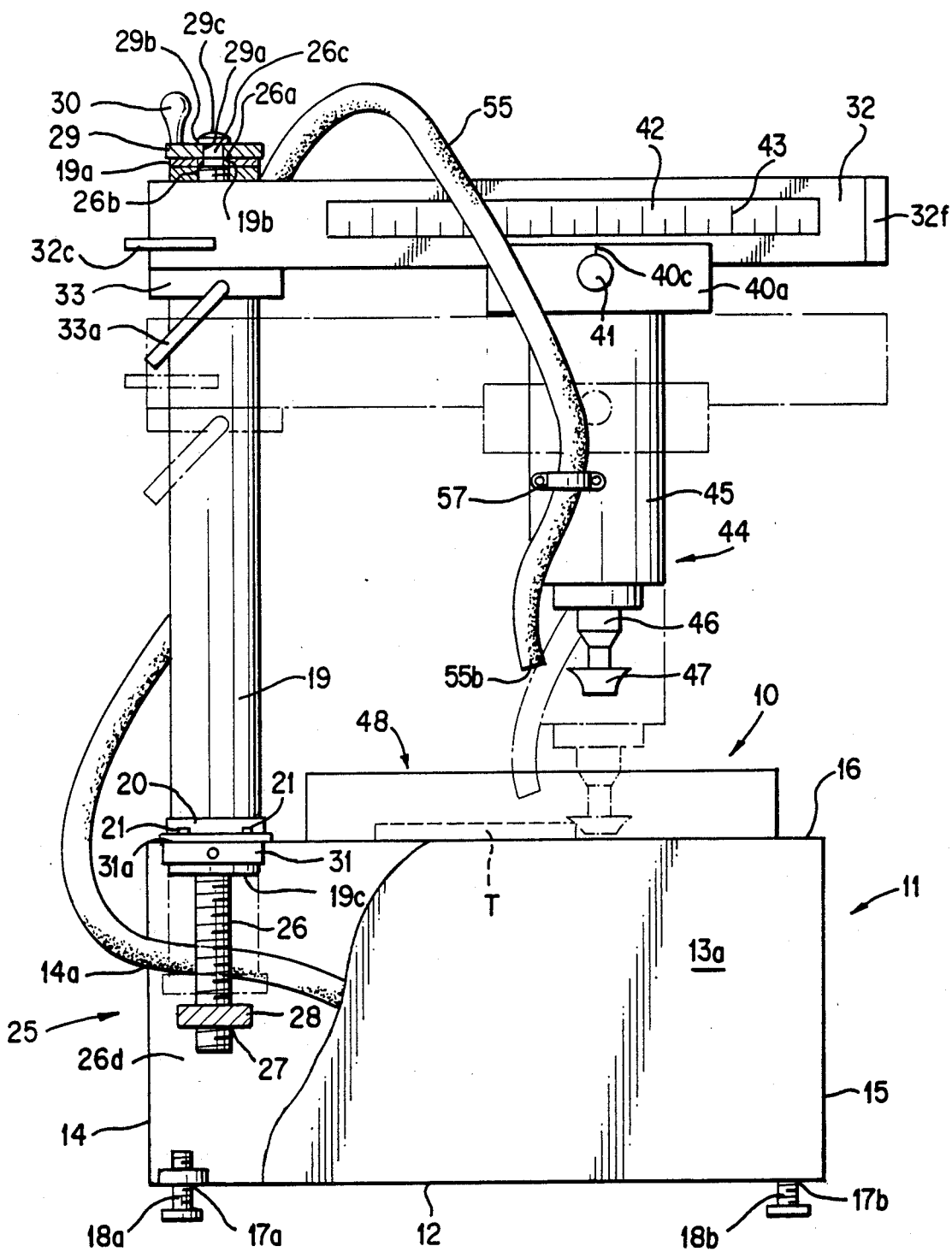
FIG. 2 is the same left side diagrammatic elevational view shown in FIG. 1 with the horizontal arm and entire cutting assembly shown in a raised position in solid lines, and shown phantomized in dotted lines in a lowered position for cutting and drilling; and with the top portion of the vertical support arm broken away in fragmentary cross section to show the operative association of the cap and the threaded rod with the vertical support arm.
Figure 3:
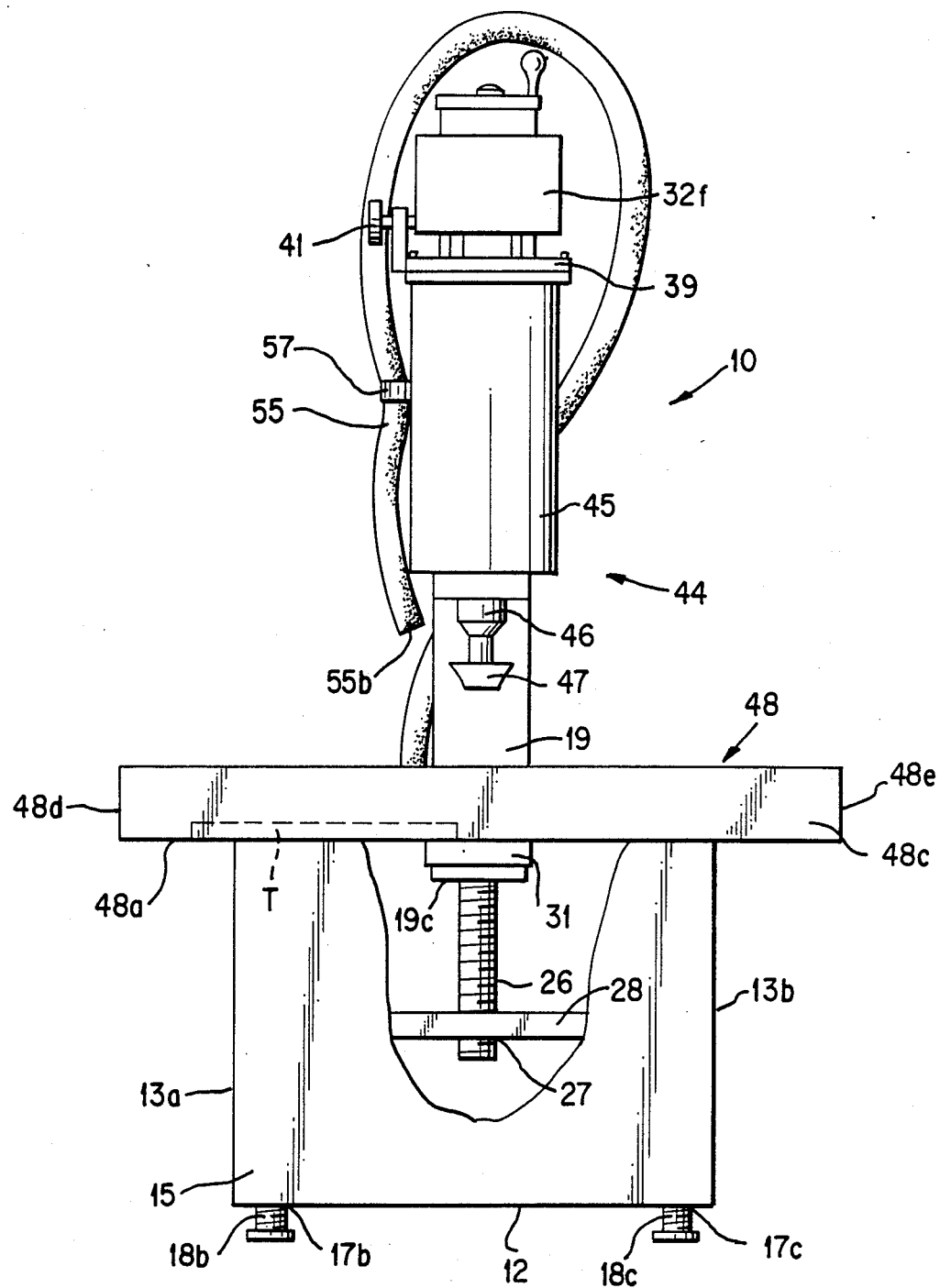
FIG. 3 is a front diagrammatic view of the portable apparatus for drilling and shaping tile shown in FIG. 1 with the base broken away in fragmentary cross section to show the operative relation of the threaded rod with respect to the cross member.

By reference to FIG. 2, the base assembly 11 is shown to have a hollow, cylindrically shaped vertical support arm 19 extending upward through the top panel 16 of base assembly 11. At its upper end, the support arm 19 is fitted with end member 19a, a shaped disc sized to be of the same diameter as the support arm 19 and attached thereto by welding or other suitable means. Circular bore 19b, centrally located in end member 19a, is sized to receive the boss 26a at the end of threaded rod 26 and thereby maintain the threaded rod 26 centrally aligned along the longitudinal axis of the support arm 19. Annular flange 20, connected to the top panel 16 of the base assembly 11 by screws or bolts as at 21, snugly surrounds the support arm 19 and maintains its alignment in a vertical direction.

Support arm 19 is so assembled with respect to the base assembly 11 that it may be slidably lowered into the base assembly 11 or slidably raised out from the base assembly 11 by the action of turnbuckle assembly 25.

Turnbuckle assembly 25 includes threaded rod 26 located within the support arm 19 and so sized as to extend beyond the lower edge of the support arm 19 into engagement with threaded bore 27 in cross member 28. Cross member 28 has a rectangular cross section and in assembled position extends fully from side panel 13a to side panel 13b and is attached to said side panels by any suitable means. At the opposite end of the threaded rod 26 is a short boss 26a sized to fit into the circular bore 19b of end member 19a, thereby defining shoulder 26b in abutment with the inner surface of end member 19a. An integral square cross sectioned portion 26c beyond the boss 26a on the threaded rod 26 extends outboard of the end member 19a for mating engagement with the square opening 29a in cap 29.

As is shown in FIG. 2, cap 29 is a generally flat round member so sized that in assembled position adjacent to end member 19a its circumference is essentially equivalent to the circumference of the support arm 19. The cap 29 and the threaded rod 26 are held in assembled position by washer 29b and threaded connector 29c. A handle 30 for rotating the cap 29 and thereby adjusting the turnbuckle assembly 25 is attached thereto by any suitable means.

In the operation of the turnbuckle assembly 25 to lower the support arm 19, cap 29 is rotated in a clockwise direction through the use of the handle 30, thereby causing the threaded rod 26 to be guided downward through the threaded bore 27 in cross member 28. As the threaded rod 26 is guided in a downward direction, integral square portion 26c is pulled downward along with associated cap 29, exerting a downward force on end member 19a so that the support arm 19 is thereby lowered into the base assembly 11.

A similar but opposite action raises the support arm 19. Thus, the cap 29 is rotated in a counter-clockwise direction by using the handle 30, thereby causing the threaded rod 26 to be guided upward through the threaded bore 27 in cross member 28. The movement of the threaded rod 26 upward results in a downward force on the cross member 28 and an equal but opposite upward force on end member 19a by the shoulder 26b of the threaded rod 26, thereby resulting in the upward movement of the support arm 19 out of the base assembly 11.

Annular collar 31, fixedly connected about the lower end of the support arm 19 below the top panel 16 of the base assembly 11, defines shoulder 31a, thereby forming a stop to prevent the support arm 19 from being accidentally raised out from the base assembly 11. Thus, as the support arm 19 is raised to its full extension, the shoulder 31a abuts the top panel 16 of the base assembly 11 to prevent further movement The spaced distance between the bottom edge 19c of the support arm 19 and the cross member 28 and between the lower end 26d of the threaded rod 26 and the flat bottom panel 12 of the base assembly 11, is such as to permit the support arm 19 to raise and lower a sufficient distance to alternately engage and disengage the router assembly 44 from the tile T being drilled or shaped. Separate means for coarsely adjusting the height of the router assembly 44 to accommodate various thicknesses of tile will be discussed more fully hereinafter.

Horizontal housing 32 is rectangular in shape, having a circular opening 32a at one end sized to accept the support arm 19 and to permit the housing 32 to be rotated about or positioned along the longitudinal axis of the support arm 19. The bottom of the housing 32 is generally open from a point a spaced distance from the support arm 19 for the remainder of its length which extends slightly beyond the front panel 15 of the base assembly 11 and thereby allows the router assembly 44 to be positioned along the housing 32 by radial slide 34 housed within it.

Annular collar 33 mounted about the support arm 19 and slidable thereon serves to support the housing 32 in the vertical direction. Locking lever 33a operatively connects the annular collar 33 to the support arm 19. Thus, by loosening the locking lever 33a, repositioning the annular collar 33 longitudinally along the support arm 19 and retightening the locking lever 33a, the height of the housing 32 with respect to the top of the base assembly 11 will be adjusted. This coarse means of adjusting the height of the housing 32 can be used to reposition the router assembly 44 to accommodate tile of varying thickness.

As housing 32 is free to rotate about the longitudinal axis of the support arm 19, it is provided with locking lever 32c to operatively connect it to the support arm 19 and thereby fix its position both rotationally and linearly with respect to said support arm 19.

Figure 5:
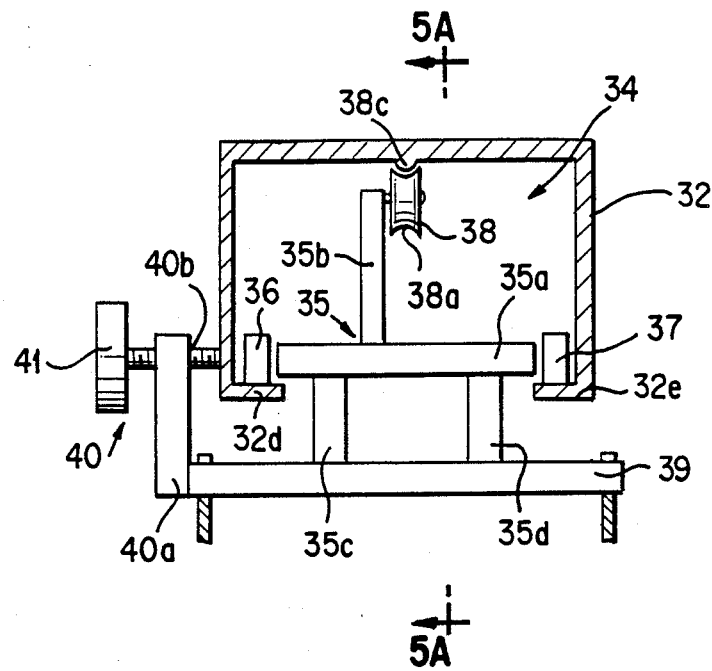
FIG. 5 is a diagrammatic cross section taken on line 5—5 of the portable apparatus for drilling and shaping tile shown in FIG. 1, with the entire cutting assembly removed and showing by end cross section the sliding mechanism for radially positioning the cutting assembly with respect to the vertical support arm.
Figure 5A:
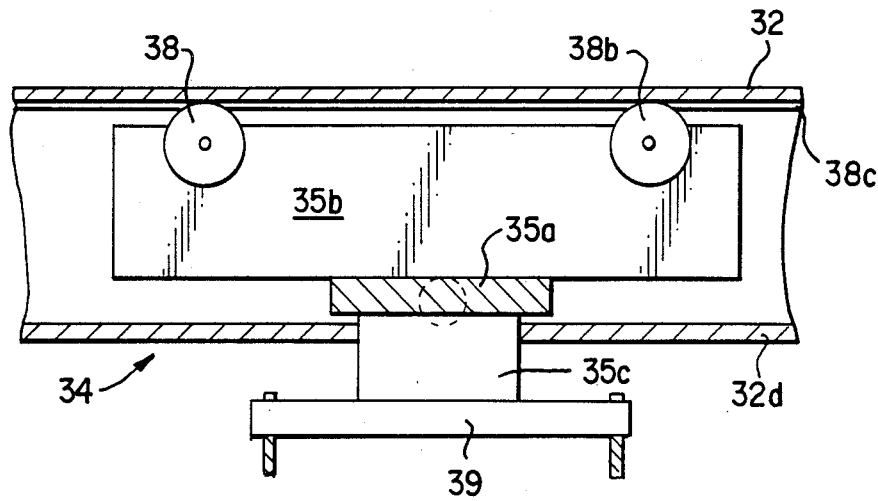
FIG. 5A is a view taken on line 5A—5A of FIG. 5, showing in horizontal cross section the sliding mechanism for radially positioning the cutting assembly with respect to the vertical support arm.

FIGS. 5 and 5A clearly show that radial slide 34, positioned within housing 32, has a central structural member 35 and guide wheels 36, 37, 38 and 39. Structural member 35 includes a horizontal flat plate member 35a and an upright guide member 35b and two spaced vertical connecting members as at 35c and 35d, all connected generally normal to the flat plate member 35a by any suitable means. Guide wheels 36 and 37 are rotationally mounted at the side edges of the flat plate member 35a. Rotationally mounted to one side of the upright guide member 35b at a forward position and a rear position are guide wheels 38 and 38 in such manner that a portion of their circumference extends beyond the top edge of the upright guide member 35b.

In assembled position within the housing 32, guide wheels 36 and 37 and thereby the radial slide 34, are supported by shoulders 32d and 32c formed at the bottom edge of the housing 32. Guide wheels 38 and 38b, having notched or grooved circumferences as at 38a, are matingly aligned with longitudinal rib 40 on the inside of the upper portion of the housing 32. Guide wheels 36 and 37 permit the easy movement of the radial slide 34 within the housing 32, while guide wheels 38 and 38b maintain its alignment therewith and prevent the radial slide 34 from bouncing within the housing 32 during the operation of the present invention. Housing end 32f secures to the open end of the housing 32 by any suitable means, thereby closing the end thereof, and acts as a stop to prevent the accidental movement of the radial slide 34 out of the housing 32.

At an edge opposite flat plate member 35a, spaced vertical connecting members 35c and 35d are connected generally normal to flat plate member 39 by any suitable means. Flat plate member 39 attaches to and supports the router assembly 44, so that as the radial slide 34 is positioned along the housing 32, the associated router assembly 44 is also so positioned.

Flat plate member 39 is so sized as to accept the router assembly 44 for attachment thereto, but extends beyond the sides of the housing 32. At one edge of the flat plate member 39 and connected generally normal thereto by any suitable means is radial slide locking assembly 40. Radial slide locking assembly 40 includes rectangular plate 40a extending upward from the flat plate member 39 a spaced distance from the side of the housing 32 and threaded bore 40b sized to receive threaded set screw 41 therethrough for engagement with the side of the housing 32. Thus, as the set screw 41 is tightened against the housing 32, the radial slide 34 and the associated router assembly 44 become operatively fixed in position relative to the housing 32. A scale 42 disposed on the side of the housing 32 adjacent to the radial slide locking assembly 40 provides indicia 43 that, when used in conjunction with indicating line 40c marked on the radial slide locking assembly 40, aid in setting the router assembly 44 to the proper position for the drilling or shaping operation to be performed on the tile.

Router assembly 44 is fixedly mounted to flat plate member 39 to be radially positioned by the associated radial slide 34 a measured distance from the support arm 19 along the housing 32. Included in the router assembly 44 is router 45 or any other rotational drilling and cutting device suitable for processing hard tiles. Router 45 is provided with chuck 46 to hold drilling or cutting tools 47, such as the bull-nosed shaping tool shown in FIGS. 1, 2 and 3, for rotation with the router 45. Routers and other rotational drilling and cutting devices, as well as chucks and drilling and cutting tools for hard tiles are well known in the art and, therefore, will not be more fully described.

Figure 4:
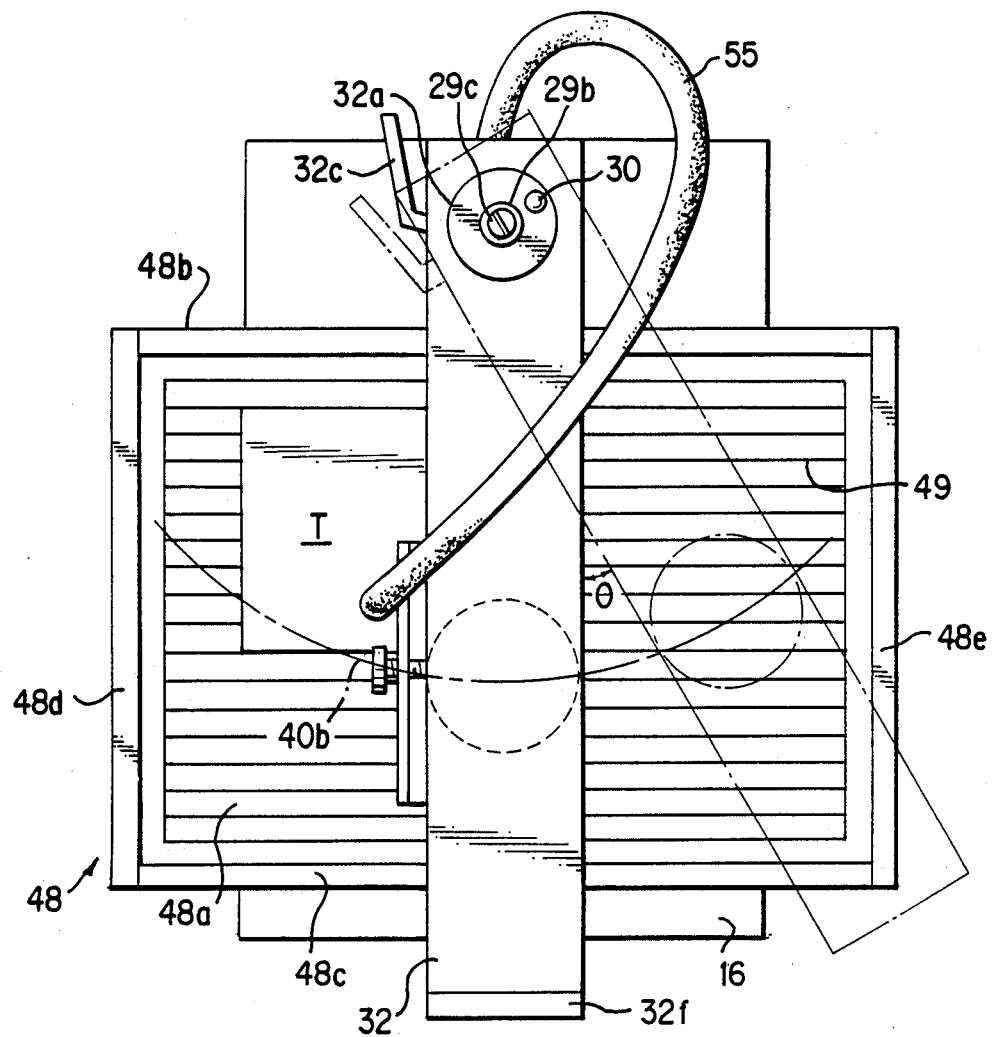
FIG. 4 is a top diagrammatic plan view of the portable apparatus for drilling and shaping tile shown in FIG. 1 showing the guidelines of the positioning tray; and showing the horizontal arm and cutting assembly perpendicular to the positioning tray in solid lines and shown phantomized in dotted lines an angular distance from the perpendicular position.

Connected to the top of the base assembly 11 and, more particularly, to the flat top panel 16, is work tray 48. Work tray 48 consists of a horizontal flat bottom member 48a, two upright side members 48b and 48c connected generally normal to the flat bottom member 48a by any suitable means, and two upright end members 48d and 48e connected generally normal to the flat bottom member 48a in a manner that will allow for their easy removal therefrom to accommodate the processing of tile having a length greater than that of the work tray 48. As shown in FIG. 4, the flat bottom member 48a is provided with indicia 49 for positioning and guiding the tile T with respect to the drilling or cutting tool 47 during the drilling or shaping operation of the present invention. Flat bottom member 48a is also provided with a centrally located drain 50 which extends downward through an opening in the flat top panel 16 of the base assembly 11 to connect with the return tubing 56 of liquid recirculating system 52.

The portable apparatus for drilling and shaping tile of the present invention includes a liquid recirculating system 52 to provide a cooling and lubricating liquid L to the cutting tool 47 as it drills or shapes the tile T. Cooling and lubricating liquid L is any liquid, such as water or ethylene glycol, which will dissipate the heat generated during the drilling or shaping of tile T and lubricate the interface between the cutting tool 47 and the tile T to reduce the friction between them during said operations.

By referring to FIG. 1, the liquid recirculating system 52 is shown to consist of reservoir 53 located in the interior of the base assembly 11, submersible pump 54, and associated and related supply tubing 55 and return tubing 56. Submersible pumps such as that included in the present invention are well known in the art and, therefore, will not be more fully described.

Submersible pump 54 is positioned at the bottom of the reservoir 53 within the cooling and lubricating liquid L. Inlet end 55a of supply tubing 55 is fixedly connected to the outlet 54a of the submersible pump 54. Supply tubing 55 then extends through opening 14a in the back panel 14 of the base assembly 11 towards the router assembly 44 where it terminates at an outlet end 55b adjacent to and directed at the cutting tool 47. Any suitable type of clamp 57 or other attachment means fixedly secures the supply tubing 55 to the router assembly 44 at or near the cutting tool 47 for proper alignment therewith. The length of the supply tubing 55 from the opening 14a in the back panel 14 to the clamp 57 is sufficient to allow the movement of the router assembly 44 along the full extent of the housing 32 without the crimping of or other restriction by the supply tubing 55.

Return tubing 56 is fixedly connected at an inlet end 56a to the drain 50 in the work tray 48 and extends downward to an outlet end 56b within the reservoir 53.

OPERATION

In order to shape the edge of tile T the tile is positioned flatly in the work tray 48 and the height of the router assembly 44 is adjusted by loosening locking lever 33a, repositioning annular collar 33 so that the appropriately shaped cutting tool 47 is close to the surface of the tile T, and retightening locking lever 32c is tightened to prevent the rotation of the housing 32 on the support arm 19 during the shaping operation.

Router assembly 44 can then be slid along the housing 32 until positioned at the edge of tile T, and locked in place relative to the housing 32 by tightening set screw 41. By turning handle 30 in the clockwise direction, the turnbuckle assembly 25 causes support arm 19 to be lowered into the base assembly 11. At the same time, the housing 32 and the router assembly 44 are also so lowered until the cutting tool 47 is at the proper height for shaping the tile T. This movement can be seen as depicted by the phantomized dashed lines in FIG. 2.

Once the position of the router assembly 44 has been set, the pump 54 can be started in order to circulate the cooling and lubricating liquid L to the cutting tool 47. Tile T is then guided along a guideline 49 at the bottom of the work tray 48 into and past stationary but rotating cutting tool 47 as it accurately reproduces its shape in the edge of the tile.

The same shape can be reproduced on the other edges of the same tile, or on other tiles of substantially the same thickness, merely by positioning the tile on a guideline 49 on the bottom of work tray 48, and guiding it along that line into and past the cutting tool 47, without the need to adjust or reposition the router assembly 44. Similarly grooves can be shaped in the face of tile T by properly positioning tile T with respect to the cutting tool 47 and following the procedure outlined above.

To accurately drill a hole in tile T, the tile is positioned on work tray 48 and the height of router assembly 44 is adjusted by repositioning annular collar 33 as above. Next, locking lever 32c is tightened to prevent the rotation of the housing 32 on the support arm 19 during the drilling operation.

The tile T and the router assembly 44 are then moved relative to one another, the tile T along work tray 48 and the router assembly 44 along the housing 32, until the drilling tool 47 is aligned directly above the spot where the hole is to be drilled. At this point, set screw 41 is tightened to fix the position of the router assembly 44 and the pump 54 is started in order to circulate the cooling and lubricating liquid L to the drilling tool 47.

In the manner described above, the router assembly 44 is then lowered by operating the turnbuckle assembly 25, thereby lowering the drilling tool 47 to and through tile T. When the desired hole has been formed, handle 30 is turned in a counter-clockwise direction to raise the router assembly 44 and the associated drilling tool 47 for removal from the tile T. By repeating these steps, additional holes can be drilled in the same or other tiles.

When shaping an arc on the edge or face of a tile, the procedure is similar to that described above for linearly shaping the edge or face of a tile. In this case, however, locking lever 32c is not tightened so that the housing 32 is free to rotate about the longitudinal axis of the support arm 19. In order to form an arc of the desired radius, the router assembly 44 must be positioned along the housing 32 the proper distance from the support arm 19. The radii of the arcs that may be formed are limited by the extreme innermost and the extreme outermost settings possible for the router assembly 44 along the housing 32. Once the router assembly 44 has been properly set in place, set screw 41 is tightened to fix its position relative to the housing 32.

Next, tile T is aligned in work tray 48 in the proper location to enable the cutting tool 47 to cut the desired arc. The circulating pump 54 is then turned on and the router assemble 44 is swung through the tile T, shaping the desired arc in it as it goes. The phantomized dashed lines depicted in FIG. 4 show the housing 32 and associated router assembly 44 rotated by an angle - relative to the generally normal position shown in solid lines and the path they would take as they cut the measured arc into tile T.

Thus, a relatively simple portable apparatus has been described for accurately drilling and shaping tile as needed at a worksite and wherein the apparatus is easy and economical to operate.

What is claimed is:

1. A portable apparatus for processing tile in situ comprising:
   a. a base;
   b. a singular vertical support arm consisting of a lower end fixedly connected to said base, a central portion extending upward from said base and an upper end;
   c. a singular horizontal arm consisting of a proximal end, a central portion and a distal end, said arm being solely supported at said proximal end to said vertical support arm;
   d. means for supporting said arms for moving said horizontal arm from and to selected vertical positions;
   e. pivot means connecting said vertical and horizontal arms for pivotal movement of said horizontal arm about the axis of said vertical support arm in horizontal planes;
   f. means locking and releasing said horizontal arm in and from selected pivoted positions about the axis of said vertical support arm;
   g. rotatable means slidably mounted along said horizontal arm for drilling and shaping said tile;
   h. securing means to secure said rotatable means selectively along said horizontal arm;
   i. holder means fixedly connected to said rotatable means for releasably holding means for shaping tile, said holder means being rotatable with said rotatable means;
   j. tray means secured on said base for positioning and guiding said tile, said tray means comprising a flat horizontal bottom panel connected to said base, a pair of opposing end walls extending from forward and rearward edges of said bottom panel, a pair of opposing side walls removably connected to said tray at side edges of said bottom panel so as to constitute said tray as means for accommodating tiles extending past a side edge of said bottom panel of said tray;
   k. indicia means on said bottom panel for referencing the positioning and guiding of tiles in relation to said indicia means and to said rotatable means;
   l. means mounted adjacent said rotatable means for supplying a cooling and lubricating liquid to the tool means including a flexible conduit to permit movement of said liquid supply means with said rotatable means; and
   m. said bottom panel of said tray having drain means for discharging liquid therefrom.

* * * * *